United States Patent
Lindberg et al.

[11] Patent Number: 6,073,987
[45] Date of Patent: Jun. 13, 2000

[54] INTEGRATED MODULAR INSTRUMENT PANEL ASSEMBLY

[75] Inventors: Kenneth M. Lindberg, Holland; David L. Chapman, Lake Orion; Richard J. Giba, Ann Arbor; Joaquin R. Tittle, Ypsilanti; Marjorie M. Duesterberg, Holland; James T. Wilkinson, Grand Haven, all of Mich.

[73] Assignee: Prince Corporation, Holland, Mich.

[21] Appl. No.: 09/221,493

[22] Filed: Dec. 28, 1998

Related U.S. Application Data

[60] Provisional application No. 60/070,348, Jan. 2, 1998.

[51] Int. Cl.[7] ........................................... B62D 25/14
[52] U.S. Cl. ............................................... 296/70; 180/90
[58] Field of Search ........................... 296/70, 194, 208, 296/192, 191; 180/90

[56] References Cited

U.S. PATENT DOCUMENTS

| | | |
|---|---|---|
| 4,391,465 | 7/1983 | Piano . |
| 4,559,868 | 12/1985 | Nonaka et al. ...................... 180/90 X |
| 4,582,156 | 4/1986 | Kochy et al. . |
| 4,597,461 | 7/1986 | Kochy et al. . |
| 4,733,739 | 3/1988 | Lorenz et al. . |
| 5,088,571 | 2/1992 | Burry et al. . |
| 5,120,106 | 6/1992 | Sakurai et al. . |
| 5,234,246 | 8/1993 | Henigue et al. . |
| 5,311,960 | 5/1994 | Kukainis et al. . |
| 5,324,203 | 6/1994 | Sano et al. ............................. 296/70 X |
| 5,358,300 | 10/1994 | Gray . |
| 5,364,159 | 11/1994 | Kelman et al. . |
| 5,556,153 | 9/1996 | Kelman et al. . |
| 5,564,515 | 10/1996 | Schambre . |
| 5,664,823 | 9/1997 | Misra et al. ............................... 296/70 |
| 5,673,964 | 10/1997 | Roan et al. ......................... 296/208 X |
| 5,676,216 | 10/1997 | Palma et al. . |
| 5,685,595 | 11/1997 | Nishijima et al. . |
| 5,685,598 | 11/1997 | Inoue et al. . |
| 5,706,170 | 1/1998 | Glovatsky et al. ................. 296/208 X |
| 5,707,100 | 1/1998 | Suyama et al. . |
| 5,709,601 | 1/1998 | Heck ..................................... 296/70 X |
| 5,762,395 | 6/1998 | Merrifield et al. . |
| 5,813,288 | 9/1998 | Simonetti ............................. 180/90 X |
| 5,823,602 | 10/1998 | Kelman et al. . |
| 5,883,777 | 3/1999 | Nishitani et al. ..................... 296/70 X |

FOREIGN PATENT DOCUMENTS

| | | |
|---|---|---|
| 2609268 | 7/1988 | France . |
| 2623776 | 6/1989 | France . |
| 2724901 | 3/1996 | France . |

*Primary Examiner*—D. Glenn Dayoan
*Assistant Examiner*—Lori L. Coletta
*Attorney, Agent, or Firm*—Harness, Dickey & Pierce, P.L.C.

[57] ABSTRACT

A modular instrument panel assembly for a vehicle wherein the assembly includes a base module having a transverse vertical wall located between the occupant compartment and the forward compartment of the vehicle and a transverse horizontal plenum above the wall and acting with the wall to provide structural support. The assembly further includes an air distribution module having an air distribution plenum providing air outlets for selectively distributing air to the occupant compartment, where the plenum provides additional structural support. The two modules are secured to one another and when installed in a vehicle provide structural support for the vehicle body and further provide a separating barrier between the forward compartment and the occupant compartment.

23 Claims, 15 Drawing Sheets

INTEGRATED MODULAR INSTRUMENT PANEL ASSEMBLY

This application claims benefit of provisional application Ser. No. 60/070,348 filed Jan. 2, 1998.

BACKGROUND OF THE INVENTION

1. Technical Field

The present invention generally relates to a vehicle instrument panel, and more particularly, to the construction of an integrated modular instrument panel assembly incorporating structural elements.

2. Discussion

The manufacture of vehicles has become increasingly the subject of cost and weight reduction efforts. At times, this effort has focused on utilizing modular subassemblies which can be installed in the vehicle as a unit during the assembly of the vehicle. One example of a module used for vehicle manufacturing is a door subassembly which integrally includes both mechanical lock and control mechanisms, components for operation of windows, and a door trim panel which includes an armrest and other features. The door subassembly is provided as a unit which can be quickly and easily installed in an outer structural door member during the assembly of a vehicle. Such a system is disclosed in U.S. patent application entitled MODULAR DOOR, Ser. No. 08/995,695, filed Dec. 22, 1997. Other examples of modular subassemblies include headliner systems in which a preformed headliner integrally includes sun visors, grab handles, overhead lighting systems, wiring harnesses, and consoles. The headliner system can then be secured to a vehicle roof during the assembly of a vehicle.

One area of the vehicle which has not been the subject of significant modular manufacturing efforts is the front area of the vehicle which extends from the engine compartment to the finish surface of the interior of the vehicle, including the instrument panel and associated components. This area is at times referred to as the front cockpit area of the vehicle. Thus, vehicles typically include sheet metal structural materials as a part of the automotive assembly process which includes separate structural components, such as cross vehicle beams and vertical support members, for providing structural rigidity to the vehicle body or framework to which other assemblies, such as the HVAC (heating, ventilation, air conditioning) system and its controls, are attached as well as an instrument panel generally having an instrument cluster therein. The present construction techniques described requires significant assembly efforts on the assembly line during the manufacture of the vehicle. Unless considerable line space and part storage space is provided along the assembly line, this manufacturing technique typically limits a particular assembly line to producing either a left-hand drive vehicle or a right-hand drive vehicle, but does not provide the flexibility required to produce a vehicle which is either left-hand or right-hand drive. Further, the present manufacturing techniques result in time consuming assembly as well as heavy structural members with redundant and overlapping portions, both of which increase the cost of producing and the weight of the vehicle and the subsequent costs of operating and/or repairing the vehicle.

Therefore, there exists a need for an integrated modular instrument panel assembly which can employ cost-effective, lightweight materials and can be preassembled for quick and convenient installation into a vehicle as an integrated unit.

SUMMARY OF THE INVENTION

The system of the present invention fulfills this need by providing an integrated instrument panel design incorporating at least a base assembly panel module and an air distribution system module. In a preferred embodiment, the system further includes an integrated structural HVAC module, an electronic distribution module, and a steering column module with all of the modules preassembled as an integrated unit. The integrated unit can be introduced into the vehicle during the assembly line manufacture of a vehicle either through the open windshield area or a door opening and is secured to the vehicle body structure or frame during assembly line construction of the vehicle. The base assembly module and air distribution module are integrally molded of polymeric material in sections which can be bonded to one another in a variety of ways to provide lateral and vertical structural support for the front cockpit area of the vehicle. The heat exchanger and the electronic distribution module of the vehicle are center mounted in a symmetrical design, thereby allowing for a left-hand or a right-hand steering column assembly to be installed in vehicles which are destined for different parts of the world.

By providing molded members which are integrally bonded, many of the separate metal structural members previously required in the instrument panel and front cockpit area have been eliminated as have the squeaks, rattles and other noises frequently associated with the mechanical attachment of such parts in vehicles. The utilization of polymeric materials provides a lightweight, relatively low cost, structurally rigid modular assembly for installation in the vehicle during assembly line manufacture, thereby significantly reducing the time, line space, and overall cost of the manufacturing process.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENT

The following description of the preferred embodiment is merely exemplary in nature and is in no way intended to limit the invention, or its application, or uses.

Figure 1:
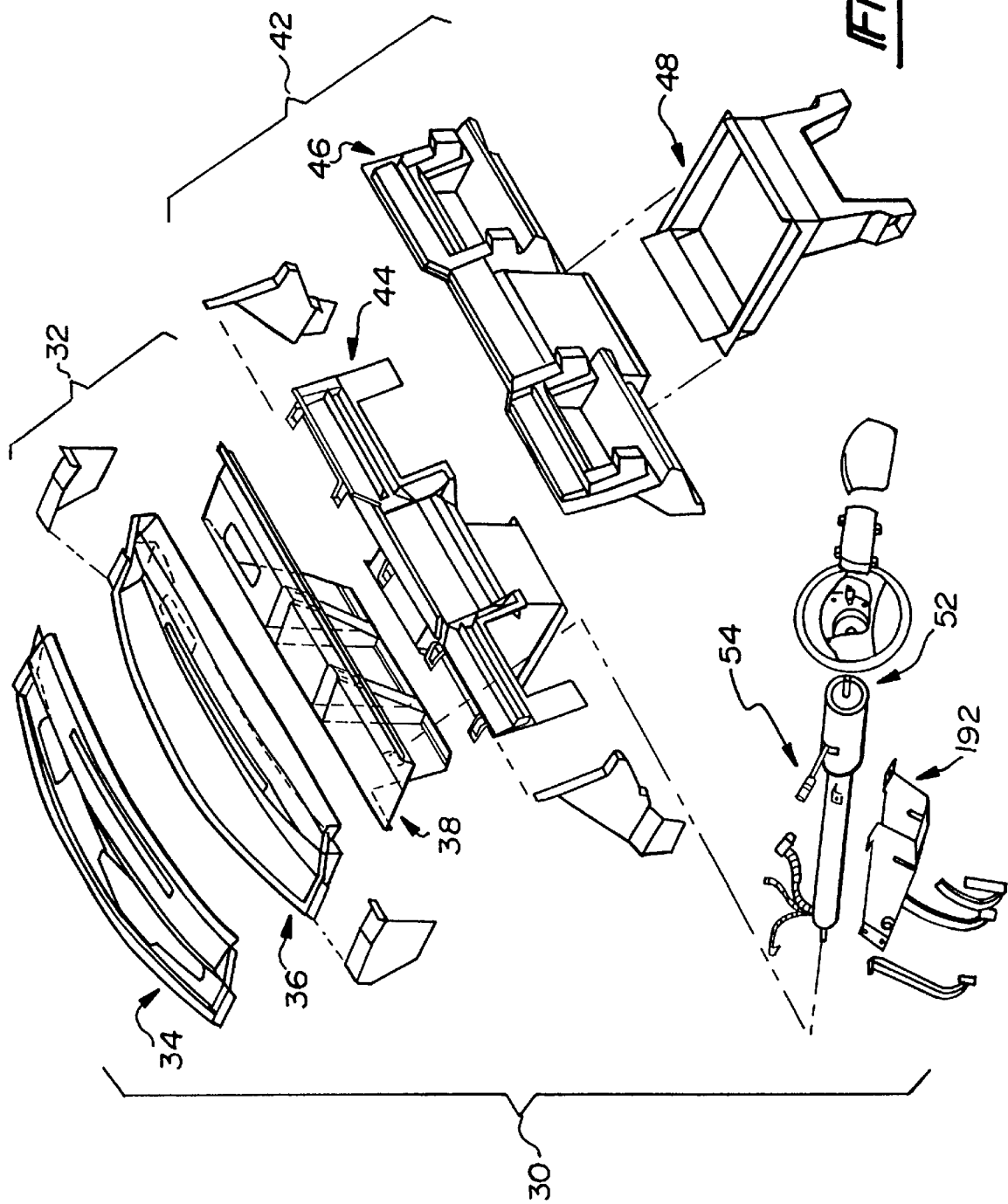
FIG. 1 is a perspective exploded view of an integrated modular instrument panel assembly made in accordance with the teachings of the present invention.

Referring to FIG. 1, there is shown an integrated instrument panel assembly 30 embodying the present invention which includes a plurality of interconnected components which are individually formed of a material having sufficient structural rigidity and temperature resistance for the environment of the front cockpit area of the vehicle, including the heating and cooling system, and engine compartment environment for those components which are exposed to that area. The preferred embodiment of the present invention utilizes a polymeric material but other materials having the physical and chemical attributes noted above can be used with equal results. Appropriate polymeric materials include, but are not limited to, polycarbonate, ABS, polypropylene, polyurethane, sheet molded compounds, resins, and other similar materials or combinations of materials. The materials may be filled, coated, or reinforced by natural or synthetic fibers or other materials to achieve the necessary physical and chemical attributes. The component can be formed in a variety of ways including, but not limited to, molding, stamping, extruding, or other now known or later developed methods. The appropriate forming method will typically be dictated by the shape of the component and the material or materials selected for the component.

The assembly 30 comprises a forward (relative to the vehicle) base module 32 having an elongated plenum top 34, an intermediate plenum bottom 36, and a platform 38. Platform 38 includes a generally vertically extending wall 40 (FIGS. 2 and 3) forming an endothermic reaction barrier between the engine compartment and the passenger compartment when instrument panel assembly 30 is installed in a vehicle.

The base module 32 forms the forward and upper support walls of the front cockpit area of vehicle, projecting into the passenger compartment and extending into the engine compartment, as well as providing support for the windshield above the plenum top 34 as will be described in greater detail below. The plenum top 34, plenum bottom 36, and platform 38 of the base module 32 are preferably individually integrally molded components made of a sheet molded compound, such as reaction injection molded polyurethane having a thickness of from about 3 to 5 mm and preferably 4 mm. In the present embodiment, the components are secured together along coordinated and mating peripheral edges by utilizing a suitable bonding adhesive material. Other methods may be appropriate for securing the components to one another, depending upon the materials used to form each component. Further, edges other than the peripheral edges, flanges, surfaces, or other features and formations may be used to secure the various components of the present invention to one another and to the vehicle to which the assembly 30 is secured.

Mounted to the rearward facing surfaces of the base module 32 is the air distribution module 42. The module 42 includes a front duct assembly 44, a rear duct assembly 46, and an HVAC closeout duct assembly 48, the individual components of which are integrally molded of a suitable polymeric material, such as an ABS resin which can be Pulse ABS available from The Dow Chemical Company, in the preferred embodiment. The wall thickness of the duct assemblies 44, 46, and 48 in a preferred embodiment are from 2.5 to 4 mm and preferably 3 mm. The duct assemblies are joined together at their mating peripheral edges preferably by an ultrasonic welding process in the preferred embodiment. Other processes or devices may be appropriate for joining the duct assemblies depending upon the materials selected and the compatibility between the materials selected for the various assemblies.

Figure 11:
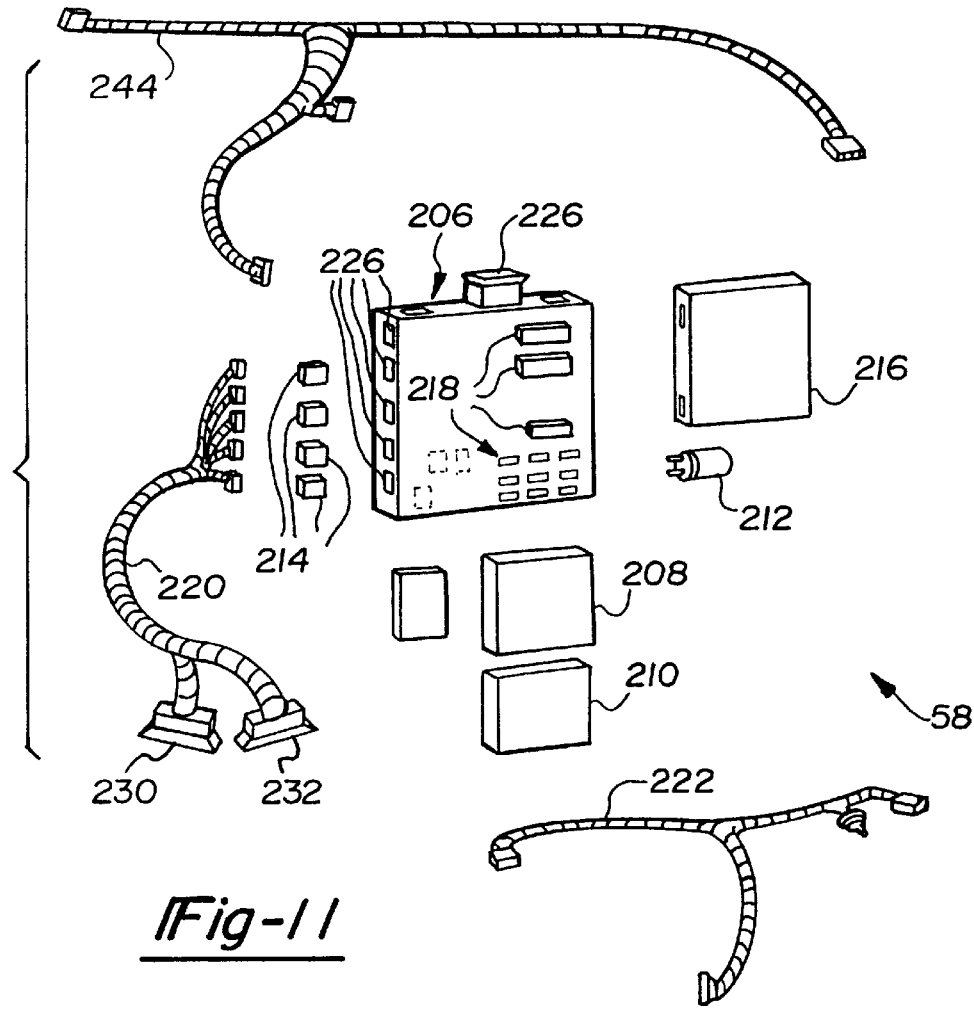
FIG. 11 is a perspective exploded view of the electrical distribution module.
Figure 15:
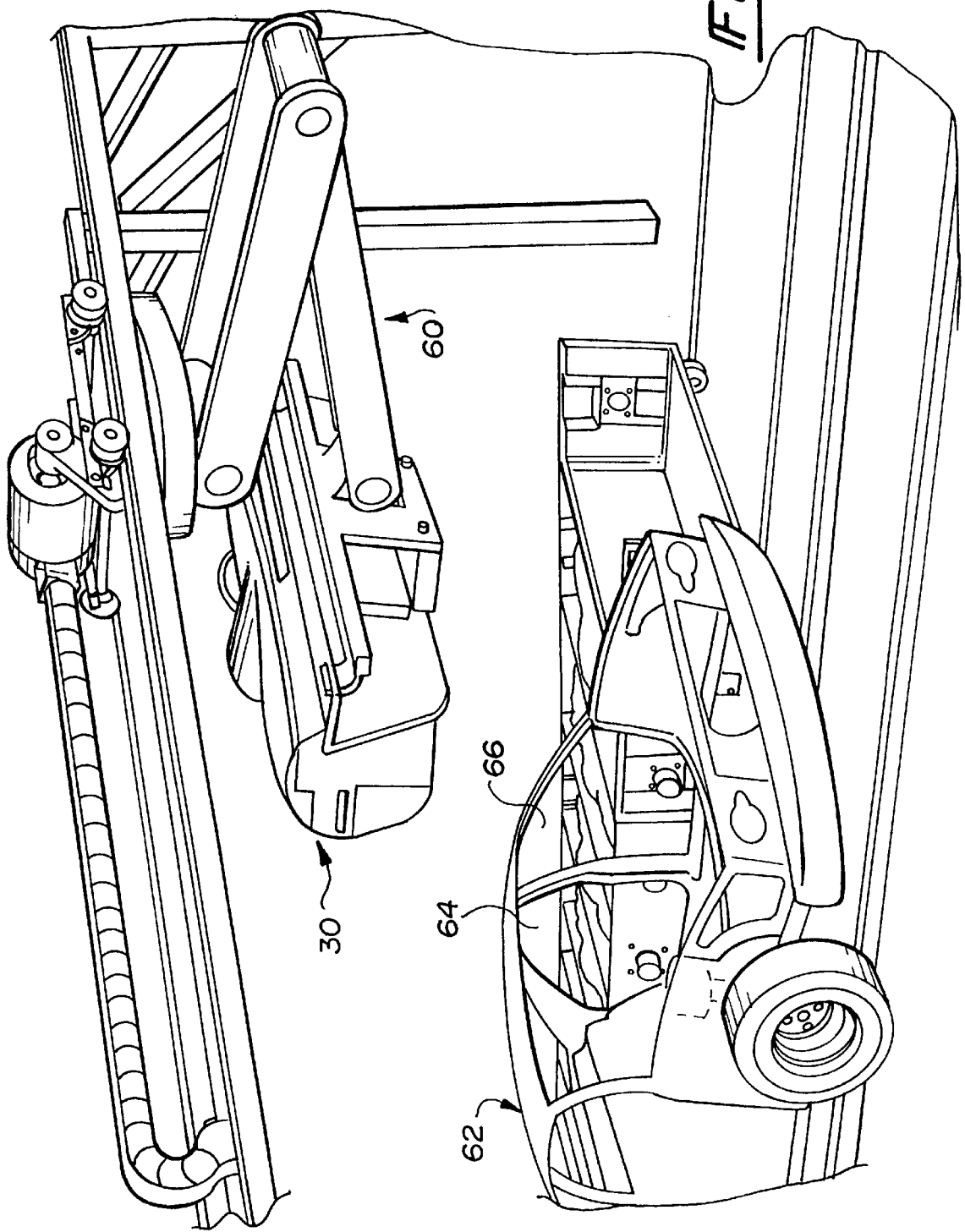
FIG. 15 is a fragmentary perspective view of the assembly line installation of a modular instrument panel assembly of the present invention to a vehicle body.

The instrument panel assembly 30 further includes a steering column support 50, which in the preferred embodiment is mounted to platform 38, and a steering column assembly 52 (shown in detail in FIG. 10) which is secured to support 50. Support 50 and assembly 52 are jointly referred to as steering column module 54. As will be described in greater detail below, the instrument panel assembly 30 further includes a blower assembly 56 (FIG. 6), an electrical distribution assembly 58 (FIG. 11), and other HVAC component parts which are shown in the perspective view in FIG. 6. These components fit together as described in connection with the description of FIG. 7. As shown is FIG. 15, the modular instrument panel assembly 30, once completed off site, is attached to an assembly line robotic insertion arm 60 for insertion into the chassis of a vehicle 62 from the front through the open windshield area 64 or, if desired, through a side door opening 66. The preassembly of the entire instrument panel assembly 30 allows for quick and easy installation of the instrument panel assembly 30 in the vehicle. Once installed, assembly 30 of the preferred embodiment is secured to the vehicle utilizing conventional fasteners around the periphery of the base module 32 thereby coupling the instrument panel assembly 30 to the structure or frame of vehicle 62. Having briefly described the overall concept of the construction and use of the instrument panel assembly 30, a description of the various modules, the inter-relationship between the various modules, the manufacture, and the function of each of he modules individually and as part of assembly 30 follows.

Figure 2:
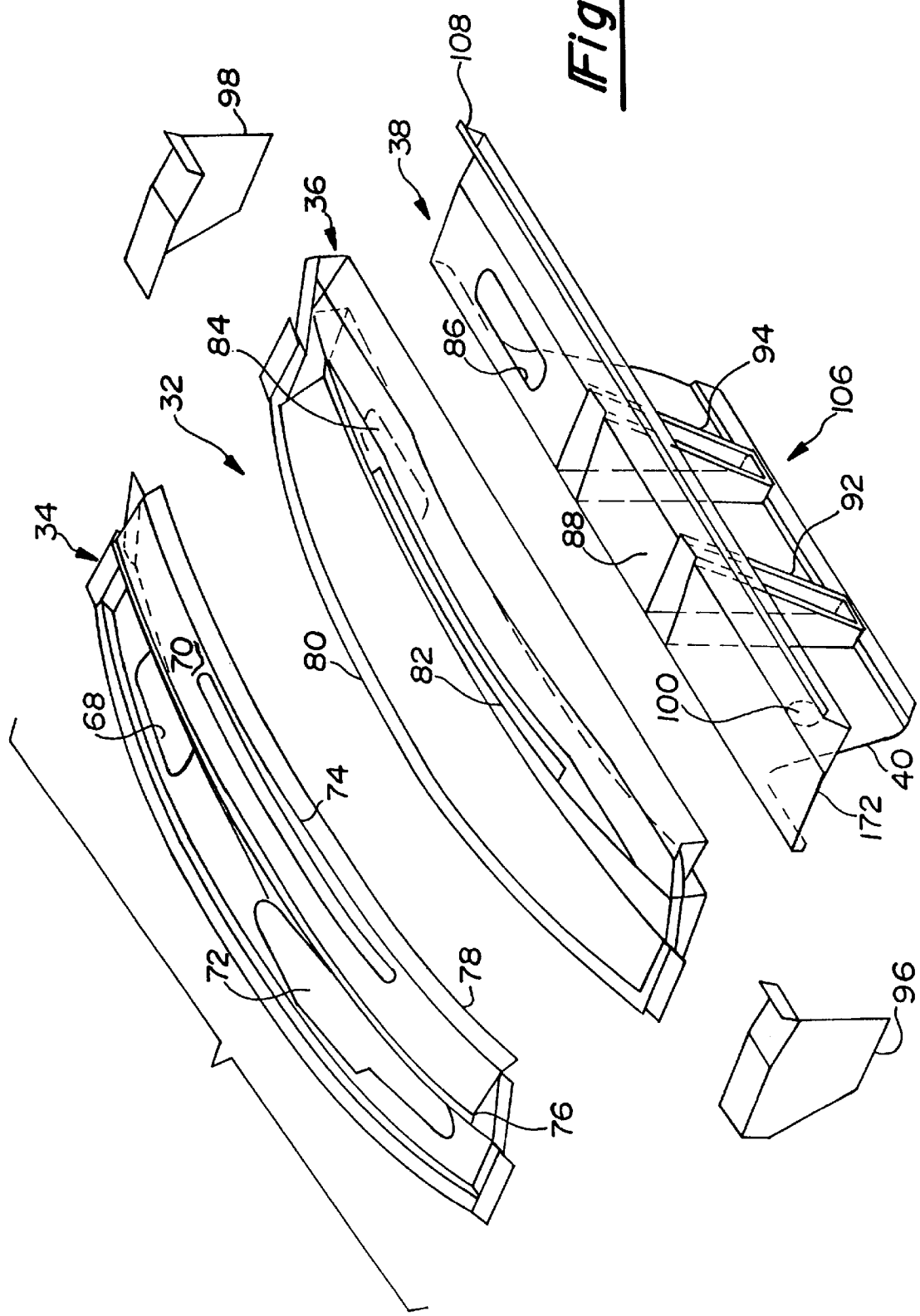
FIG. 2 is an enlarged perspective exploded view of the base module shown in FIG. 1.
Figure 3:
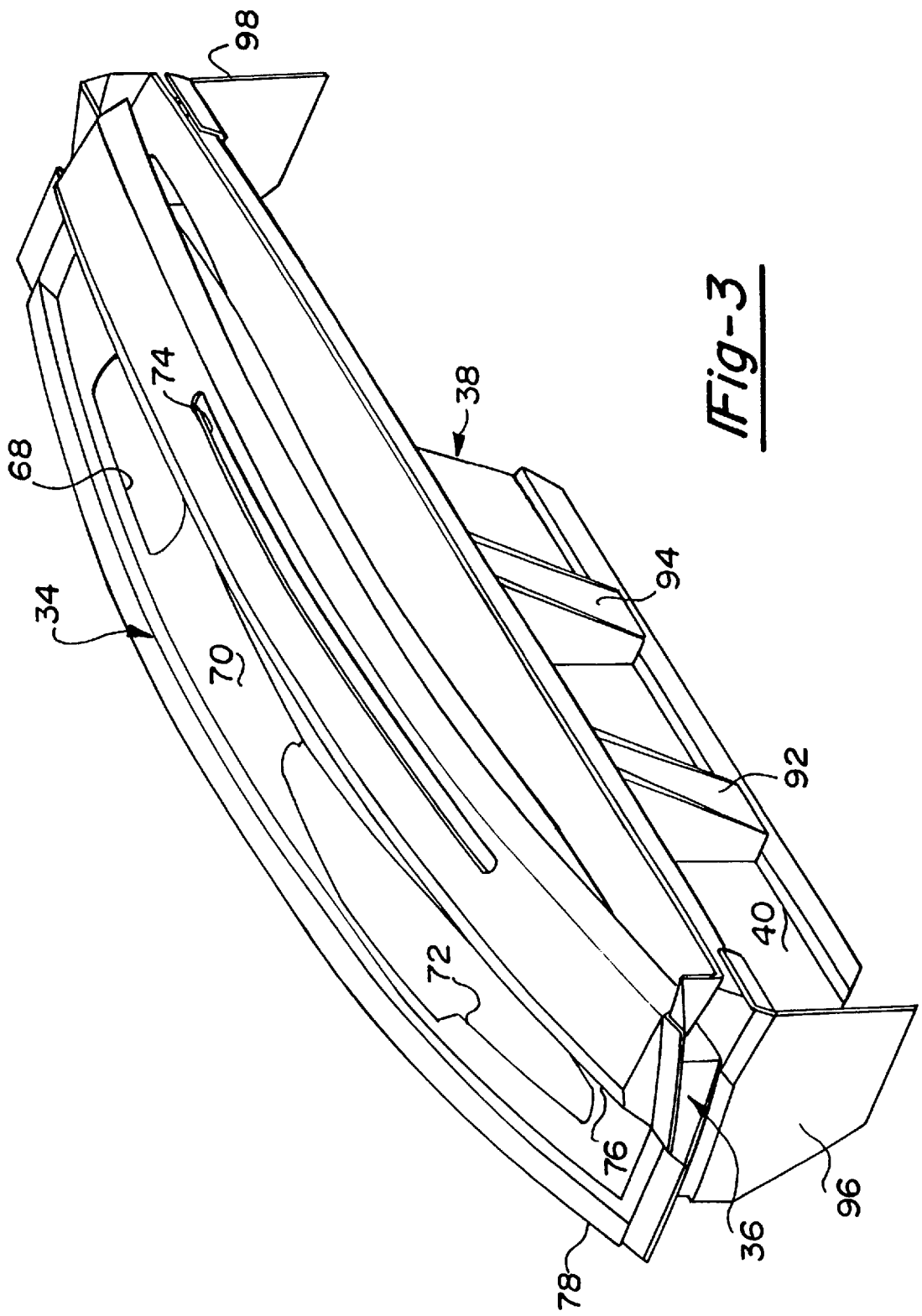
FIG. 3 is a perspective view of the base module when assembled.
Figure 9:
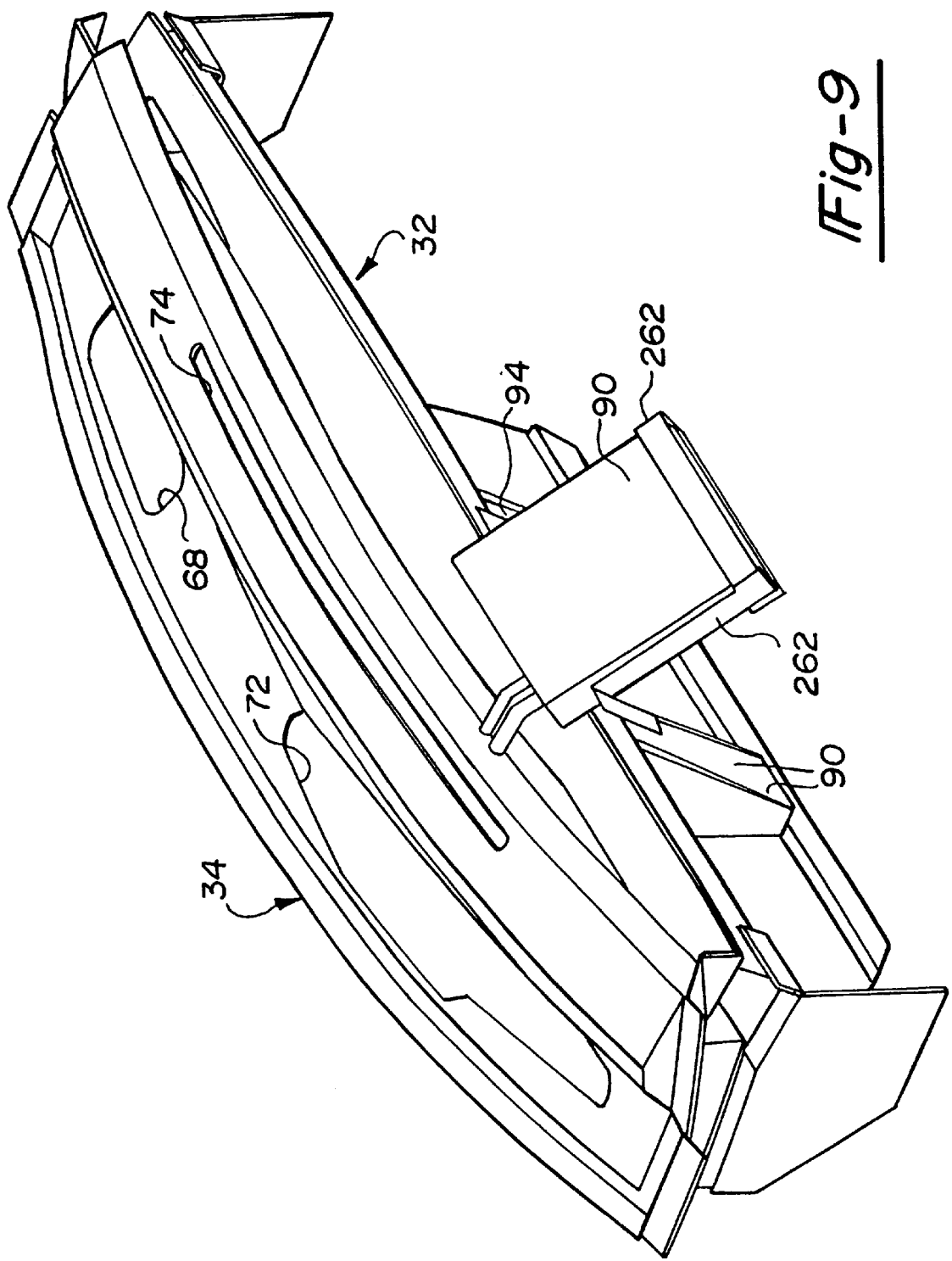
FIG. 9 is a perspective view of the base module showing the heater core mounted thereto.

The base module 32 and its components are shown in FIGS. 2, 3, and 9, in which the plenum top 34 is a slightly curved, substantially planar elongated rectangular structure including a fresh air inlet aperture 68 extending through a top surface 70 of the plenum top 34. The top surface 70 of the plenum top 34 also includes a recessed well 72 for receiving a windshield wiper assembly (not shown) and a windshield defrost outlet aperture 74. The top surface 70 of plenum top 34 further includes a windshield receiving land 76 for sealingly supporting a windshield (not shown) which separates the exterior from the interior of the vehicle.

Figure 5:
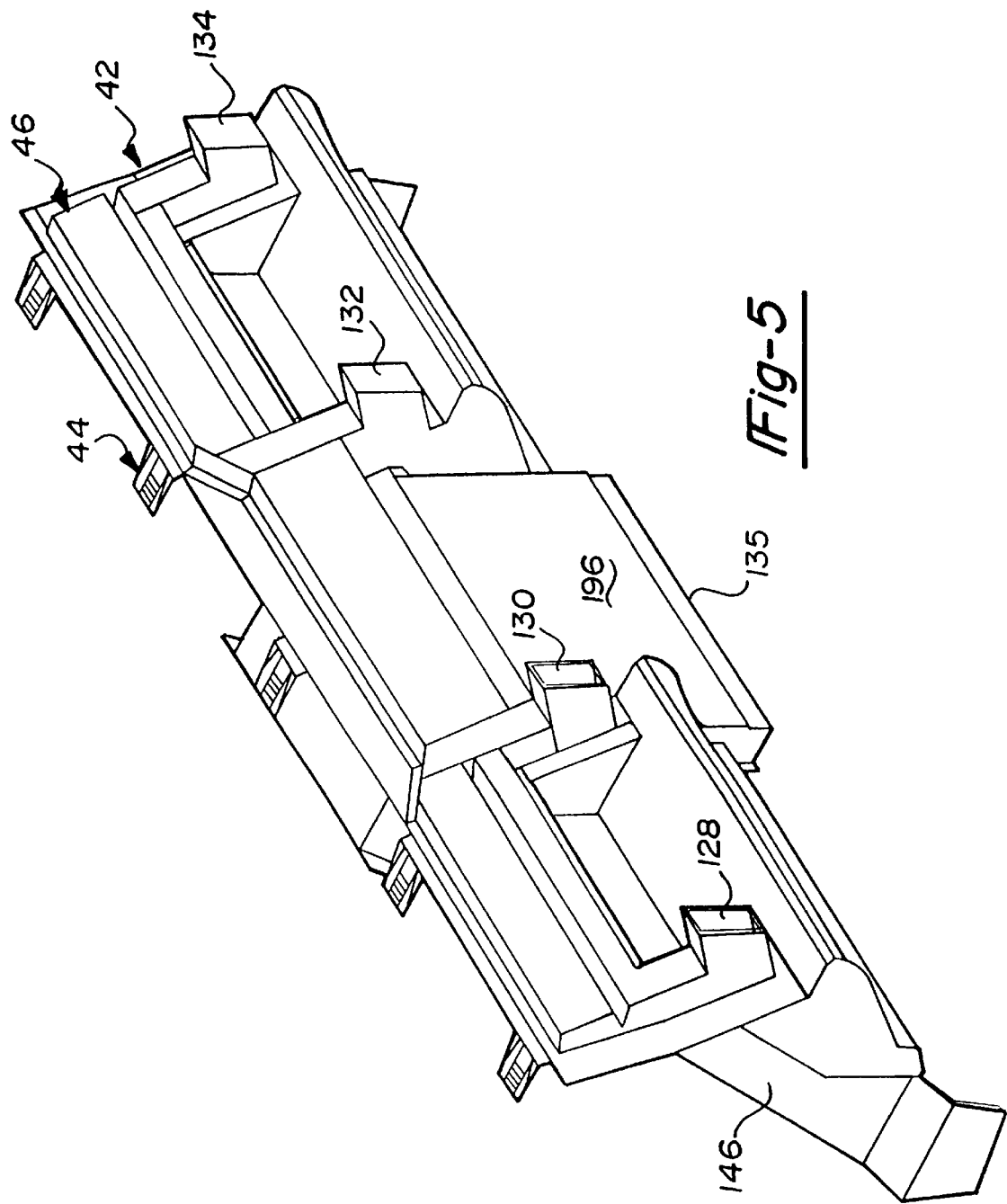
FIG. 5 is a perspective view of the air distribution module when assembled.
Figure 6:
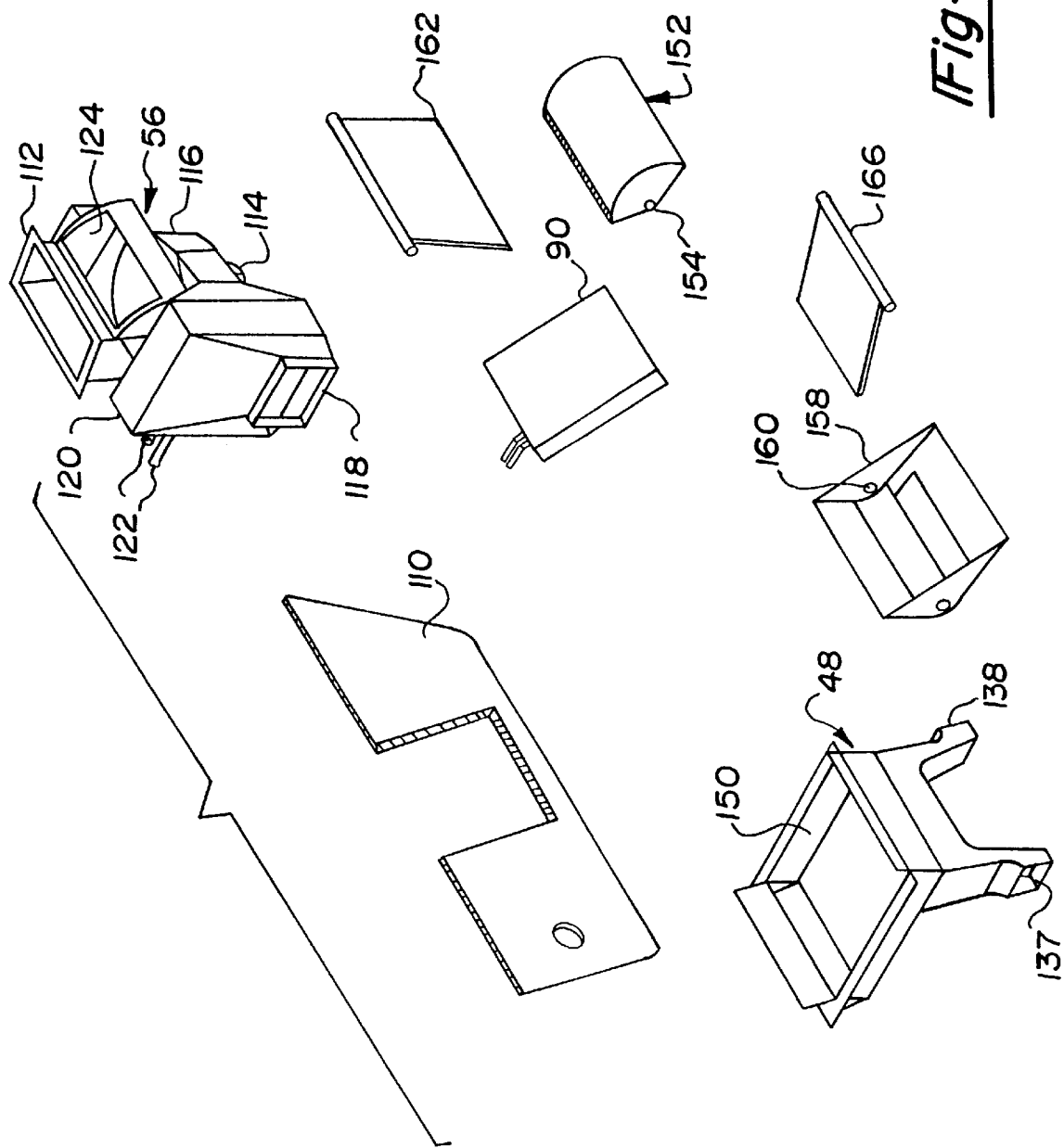
FIG. 6 is a perspective view of system components which are mounted to the base module and air distribution module of the present invention.

The plenum top 34 of the present embodiment includes a peripheral edge 78 which extends downwardly and mates with a peripheral edge 80 of the plenum bottom 36. The plenum bottom 36 also includes a defrost outlet aperture 82 aligned with outlet aperture 74 in the plenum top 34. The slightly curved, elongated generally rectangular plenum bottom 36 also includes a fresh air inlet aperture 84 which aligns with inlet aperture 68 and with a corresponding inlet aperture 86 in the platform 38 when the plenum top 34, plenum bottom 36, and the platform 38 are assembled to one another as shown in FIG. 3. The cavity formed between the plenum top 34 and the plenum bottom 36 when joined provides an upper cowl within the structure of assembly 30 allowing fresh air to be drawn from the exterior of the vehicle through coordinated inlet apertures 68, 84, and 86, and providing defrosting air to an inner surface of the windshield through the air outlet 88 of the base module 32. FIGS. 5, 6, and 9, will further disclose how the air distribution module 42 and the heat exchanger 90 are mounted to base module 32.

Figure 7:
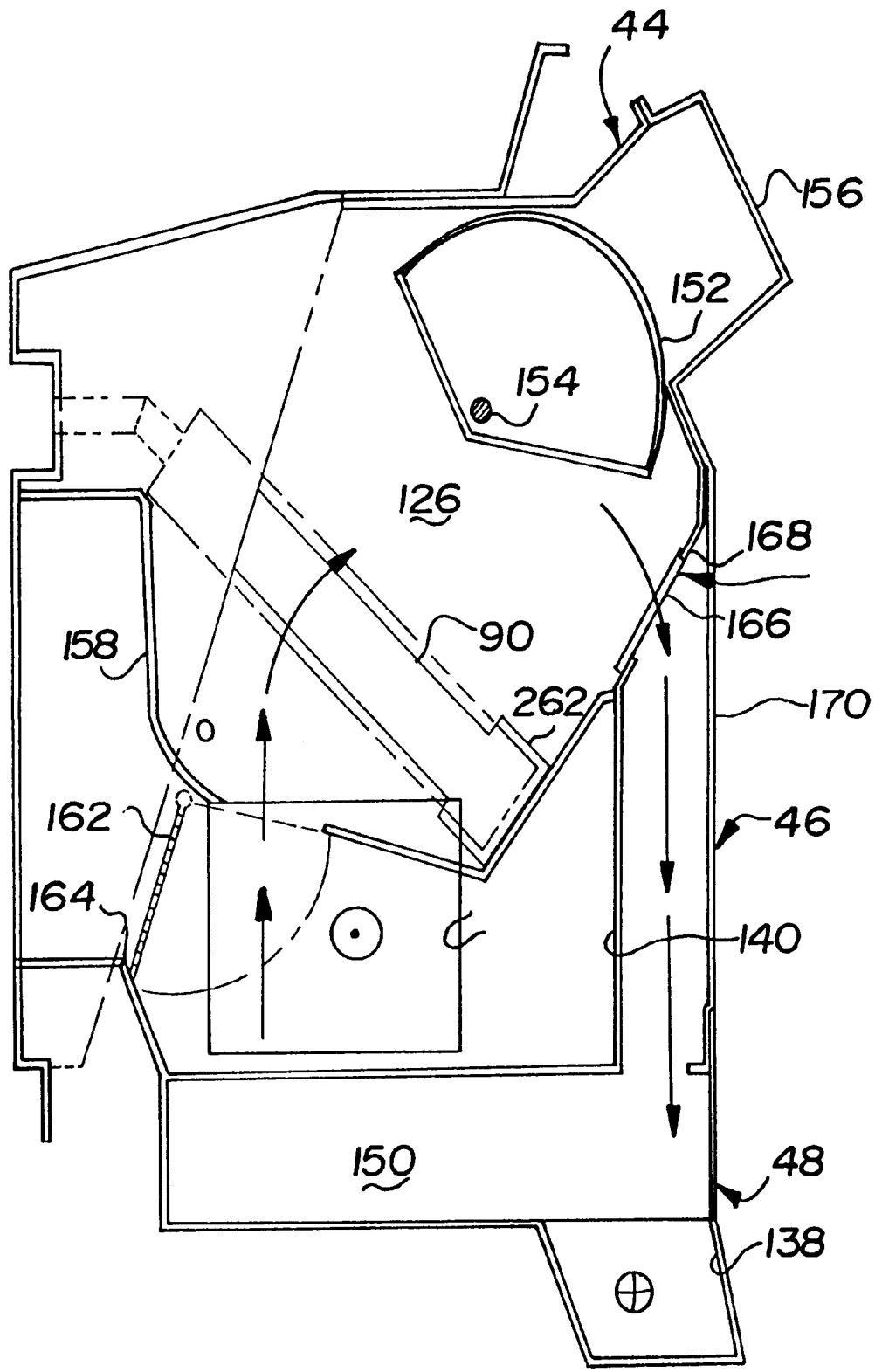
FIG. 7 is a vertical cross-sectional view of the center area of an instrument panel assembly made in accordance with the teachings of the present invention.

The platform 38 includes pairs of spaced-apart, generally triangular, downwardly extending support legs 92 and 94 for receiving the heat exchanger 90 (FIGS. 6, 7 and 9). End brackets 96 and 98 are mounted to enclose the opposite edges of members 34, 36 and 38, when assembled as shown in FIG. 3. End brackets 96 and 98 close off the cavity formed between plenum top 34 and plenum bottom 36 and thereby create an air distribution plenum. End brackets 96 and 98 also structurally reinforce base module 32 by joining the plenum top 34, the plenum bottom 36, and the platform 38 along opposite edges of each member.

As previously mentioned, the platform 38 includes a wall 40 which acts to separate the engine compartment of the vehicle from the passenger compartment of the vehicle. The wall 40 includes an aperture 100 for receiving the steering column 102 or steering shaft 104 therethrough. The preferred embodiment provides the aperture 100 on the left side of wall 40 and can be used in the construction of a left-hand drive vehicle. For a right-hand drive vehicle, the wall 40 would include aperture 100 on the right-hand side of wall 40. Alternately, an aperture could be included on both the left-hand side and the right-hand side of wall 40. In such a case, the unused aperture could be covered or sealed after the steering column 102 or steering shaft 104 where installed in the opposite side aperture. Another alternate method to provide for the steering column 102 or steering shaft 104 to be installed on either the left-hand side or the right-hand side is to provide "knock-outs" on both sides of wall 40. Under this method, just prior to installation of the steering column 102 or steering shaft 104, the knock-out for the appropriate side could be removed thereby allowing the steering column 102 or steering shaft 104 to be installed, while the opposite side knock-out would be left in place.

The unique mounting of the electrical distribution assembly 58 and the heat exchanger 90 in the center area 106 of the platform 38 within the instrument panel assembly 30 allows for the left or right side mounting of the steering column assembly 52. The flexibility to produce a right-hand drive or a left-hand drive vehicle incorporating the same instrument panel assembly 30 provides opportunities for the manufacturer to save space along the assembly line and more fully utilize the capacity of the plants which produce the vehicles. The capacity efficiency comes from the fact that domestic and foreign destination vehicles need not be manufactured on separate lines or in separate plants, and need not be restricted to any particular ratio between the right-hand drive and left-hand drive vehicles.

Figure 8:
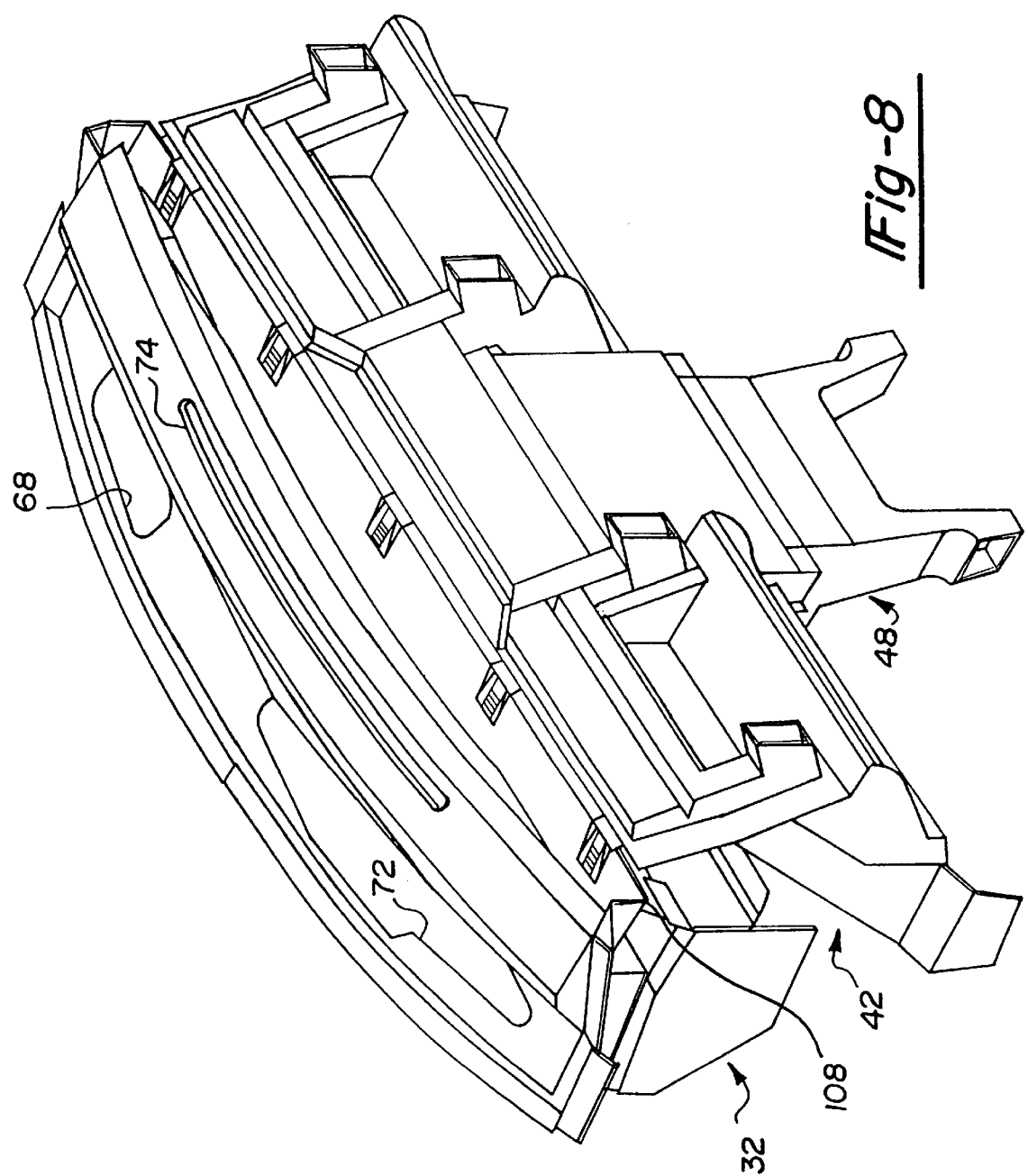
FIG. 8 is a perspective view of the base module and air distribution module when assembled.

Referring to FIG. 8, the platform 38 includes an upwardly extending lip 108 (shown best in FIG. 2) which faces rearwardly in the vehicle toward the passenger compartment and to which the air distribution module 42 is secured. In the preferred embodiment, the module 42 is secured to the platform 38 utilizing conventional fasteners and/or by welding or bonding adhesives, but as previously expressed, other methods or devices can be used depending upon the materials selected for each component. A sound deadening panel 110 (FIG. 6) is adhesively mounted or otherwise secured to the passenger compartment side of wall 40. The sound deadening panel 110 includes an aperture coordinated with the aperture 100 in the wall 40 to allow for the installation of steering column 102 or steering shaft 104. It should be noted that the panel 110 can be symmetrically formed about a vertical center line of the panel 110 such that the panel 110 can be installed with the aperture on either the left-hand side (as shown) or on the right-hand side by simply rotating the panel 110 and securing the opposite side of the panel 110 to the wall 40. This configuration would compliment the proposed alternate above in which a right-hand and a left-hand aperture are provided in the wall 40 and a cover or seal is used to plug the unused aperture. Other components are also attached to base module 32 as described in greater detail below.

Referring to FIG. 6, the blower assembly 56 will be described before describing the air distribution module 42 in detail. The blower assembly 56 is mounted to the base module 32 with an upwardly facing, generally rectangular air inlet opening 112 aligned with the aperture 86, at the right side of platform 38, for receiving fresh air from the exterior of the vehicle. The blower assembly 56 includes a blower motor 114 and a housing 116 for drawing fresh air through inlet apertures 68, 84 and 86, and for discharging air through an outlet 118 into the air distribution module 42. The assembly 56 also includes a plenum chamber 120 which receives an air conditioner evaporator having input and return lines 122 extending to an air conditioning compressor (not shown) which is mounted within the engine compartment of the vehicle. The assembly 56 further includes a chamber 124 located intermediate the opening 112 and the outlet 118 with a selectable damper valve for either drawing fresh air in through opening 112 to provide fresh air, or for drawing air from within the vehicle to provide recirculated air, to the air distribution module 42.

Figure 4:
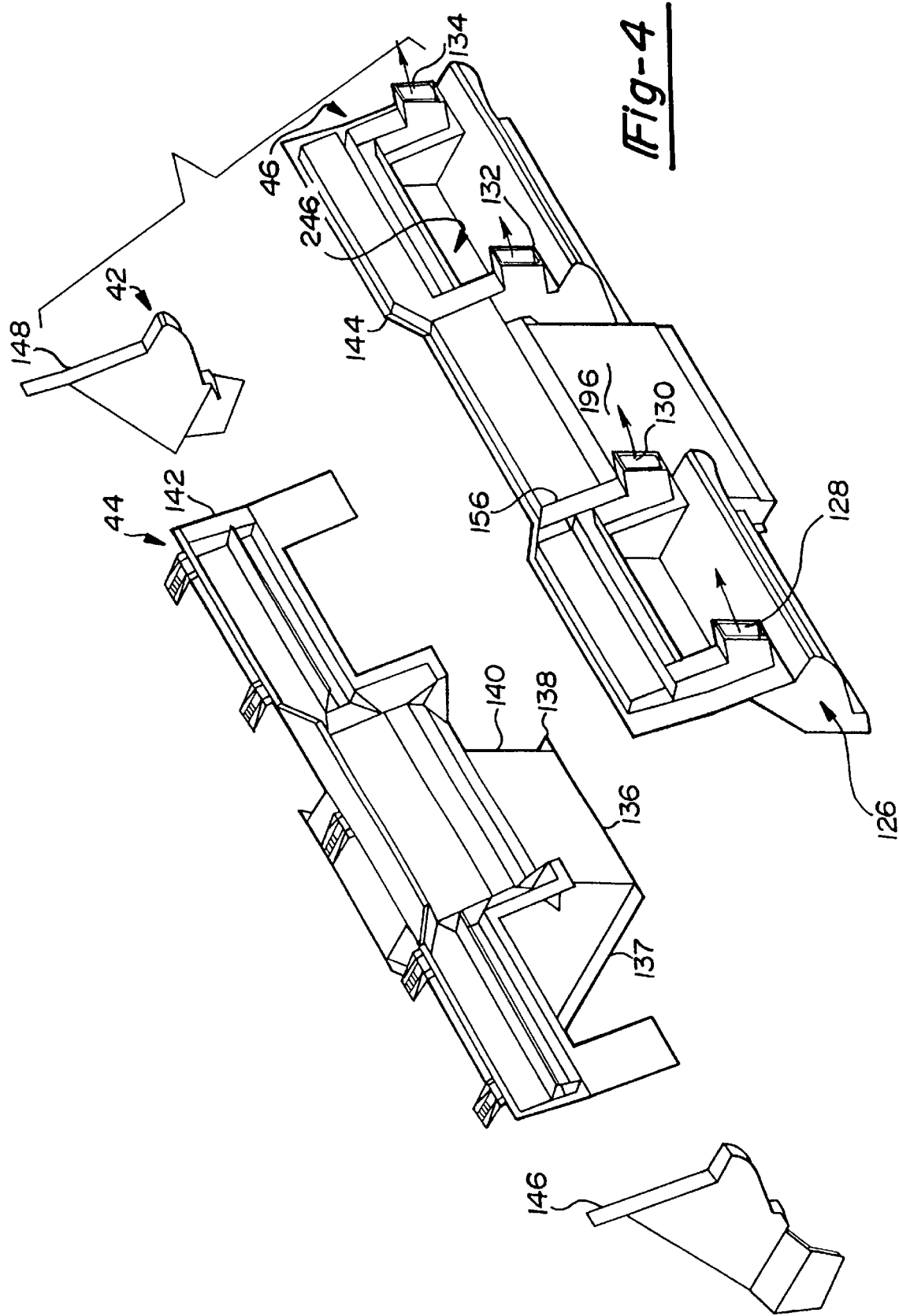
FIG. 4 is an enlarged perspective exploded view of the air distribution module shown in FIG. 1.

Referring now to FIGS. 4 and 5, the air distribution module 42 is shown to include a front duct assembly 44 toward the forward section of the vehicle and a rear duct assembly 46 toward the interior passenger compartment of the vehicle. As noted above, the duct assemblies 44, 46, and 48 of the air distribution module 42 do not need to be made of as structurally rigid a material as the base module 32, and can be made with a thinner wall thickness. The duct assemblies 44, 46, and 48 of the present embodiment are individually integrally molded, three-dimensional members of generally rectangular shape which are configured to define an air distribution plenum 126. The distribution plenum 126 provides air outlets 128, 130, 132, and 134 extending rearwardly toward the interior of the vehicle, and a downwardly projecting air outlet 135 with mounting flanges 136 for removably securing the closeout duct assembly 48

Figure 21:
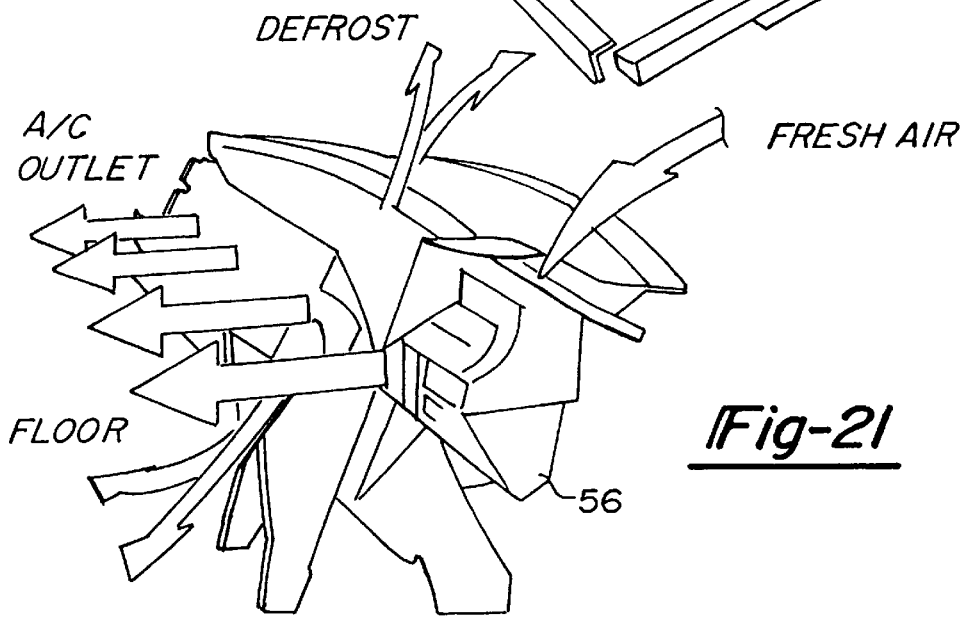
FIG. 21 is a perspective view of the base module, the air distribution module, and the closeout duct assembly, graphically depicting the air flow paths therethrough.

(FIGS. 6, 7 and 8) thereto. This configuration allows for selectively providing heated or cooled air through the upper cowl between the plenum top 34 and the plenum bottom 36, through the intermediate air outlets 128–134, or through left floor outlet 137 and right floor outlet 138 of the closeout duct assembly 48. Thus, duct assemblies 44 and 46 are three-dimensionally molded to provide channels for the distribution of air transversely across the vehicle, as well as upwardly through outlet aperture 74, outwardly through air outlets 128–134, and downwardly through a distribution duct 140 having an outlet 135 communicating with closeout duct assembly 48. The resulting air flow distribution pattern which can be achieved is graphically depicted by the air flow diagram of FIG. 21. In order to provide a sealed chamber, the peripheral edge 142 of the front duct assembly 44 and the peripheral edge 144 of the rear duct assembly 46 are formed to coordinate With and mate with one another so that the edges 142 and 144 can be ultrasonically welded or otherwise joined together with end brackets 146 and 148 closing each end of the air distribution plenum 126. The outlet 135 of distribution duct 140 communicates with the rectangular plenum 150 of closeout duct assembly 48 (shown in FIGS. 6 and 7).

As seen in FIGS. 6 and 7, the HVAC control panels or valves for controlling the air flow include a pivoted panel defrost door 152 which is pivotally mounted about axis 154 to the air distribution module 42 at a center opening 156 which communicates with the plenum bottom 36 to selectively direct air to the defrost outlet aperture 74. The panel defrost door 152 is mounted to the sidewalls of rear duct assembly 46 and is adjacent to the center opening 156 in a conventional manner and is actuated by an electrical solenoid or other suitable electromechanical device controlled by the defrost control of the vehicle in a conventional manner. The HVAC control components for air distribution module 42 also include a closeout baffle 158 for directing air to either the air outlets 128–134 or to the rectangular plenum 150 of the closeout duct assembly 48. Baffle 158 is mounted by pins 160 to the sidewalls of distribution duct 140. The HVAC control components for module 42 further include a temperature control door 162 which is generally planar and which is pivotally mounted to a rear opening 164 of front duct assembly 44 to selectively control either the amount of cool air from the air conditioner evaporator within plenum chamber 120 or the amount of warm air through heat exchanger 90 into the distribution plenum 126 for distribution to the interior of a vehicle. A floor mode door 166 is electro-mechanically operated and pivotally mounted to opening 168 in rear duct assembly 46 and selectively couples the distribution plenum 126 to a downwardly directed duct 170 into the rectangular plenum 150 of the closeout duct assembly 48. As such, when the floor mode door 166 is in an open position (opposite that shown in FIG. 7) air can flow to the floor and foot area of the interior of the vehicle. By providing the base module 32 and the air distribution module 42, both of which include major structural elements extending substantially the width of the vehicle and are each individually integrally molded and subsequently bonded together either by an adhesive or by ultrasonic welding, a rigid cross vehicle structure which provides both vertical and horizontal support is provided for the instrument panel assembly 30, while at the same time providing an air distribution system for the HVAC system of the vehicle. In a preferred embodiment of the invention, the instrument panel assembly 30 includes the additional modules now described in connection with FIGS. 10–14.

Figure 10:
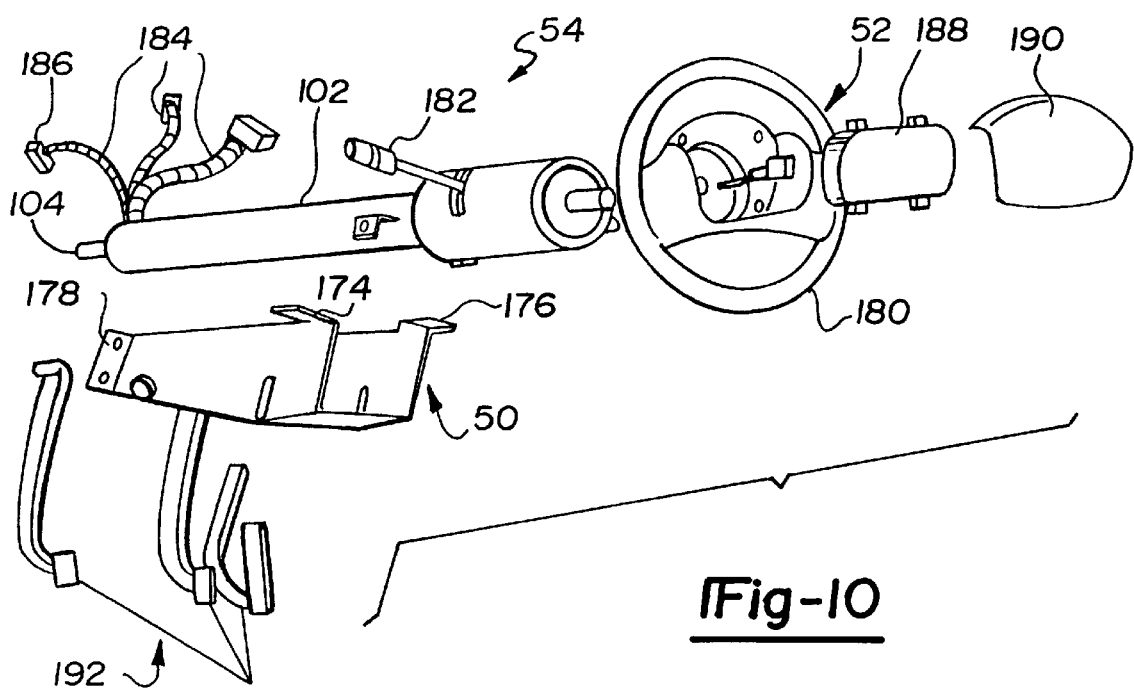
FIG. 10 is a perspective exploded view of the steering column support, steering column assembly, and pedal assembly in greater detail.

Referring now to FIG. 10, the steering column support 50 is a generally rectangular, U-shaped member which is mounted to the underside of a horizontally extending wall 172 of platform 38 (shown best in FIG. 2) and includes mounting flanges 174 and 176 for such purpose. Support 50 also includes outwardly extending flanges 178 on the laterally opposite sides of support 50 for attachment to the vertically extending wall 40 of platform 38. A steering column assembly 52 includes a steering column 102, a steering wheel 180, and other controls, including but not limited to a turn signal indicator lever 182. The controls of the steering column assembly 52 are coupled by a wire harness 184 and end plugs 186 to the vehicle electrical system to communicate with the components which they control. The steering wheel 180 includes a conventional air bag restraint 188 and cover 190 therefor. Additionally, mounted to wall 40 of platform 38 under the steering column support 50 are a brake pedal, an accelerator pedal, and on manual transmission vehicles a clutch pedal (collectively referred to herein as pedal assembly 192). The overall assembly of the instrument panel assembly 30 will be described in greater detail below subsequent to the description of the remaining modules including the electrical distribution assembly 58 shown in FIGS. 11 and 12.

The assembly 58 is preferably integrally mounted in a mounting housing 194 (FIG. 12) which is secured to the center wall 196 (FIG. 4) of the rear duct assembly 46. In a preferred embodiment of the invention, the center wall 196 of the rear duct assembly 46 is integrally formed to define the mounting housing 194 for the electrical distribution assembly 58 shown in FIG. 12. The mounting housing 194 includes a pair of vertically extending legs 198 and 200, each with vertically spaced mounting rails 202 and 204 facing inwardly toward one another for receiving various electronic and electrical components used to form a part of the electrical distribution assembly 58. The electrical distribution assembly 58 preferably includes a junction box 206, which is mounted to housing 194. In the preferred embodiment, the junction box 206 includes one or more plug-in modules, such as the cruise control module 208, the anti-lock braking system module 210, the turn signal and emergency flasher module 212, one or more relays 214, an ECM module 216, and other similar electronic and electrical modules or elements. Each of the modules or elements can be plugged into various electrical connectors or sockets 218 formed in the junction box 206 at appropriately spaced locations on box 206. The junction box 206 also includes internal wiring, electrical circuit boards, and/or components which interconnect, provide power to or from, and/or receive or transmit information from or to the various modules as required. The wire harnesses 220, 222, and 224 lead to connectors 226 in the junction box 206 and to a variety of associated electrical devices in a conventional manner. In the preferred embodiment, the wire harness 220 extends from the junction box 206 to the engine control and light system, while an HVAC wire harness 222 extends from the electro-mechanical devices controlling the control valves described above to the electrical control switches (not shown) mounted to housing 194 for controlling the HVAC system of a vehicle. The wire harness 224 extends to instrument cluster 228 (described below) and to the steering column assembly 52 for controlling the air bag restraint 188 and receiving information from the indicator lever 182. By providing a junction box 206 which is mounted to the instrument panel assembly 30, the assembly 30 can be preassembled with the wiring harnesses and various electrical control modules during the off line construction of assembly 30. This allows the instrument panel assembly 30 to subsequently be mounted and electrically "plugged in" to the associated vehicle components during assembly of the vehicle through the connectors at the end of the harnesses previously connected to the junction box 206.

Further, by providing a junction box 206 which is mounted as a component of the instrument panel assembly 30, the number of connections which must be made to the remainder of the vehicle electrical system during assembly of the vehicle can be reduced. For example, in the preferred embodiment shown, only two connectors 230 and 232 must be connected to the vehicle electrical system. Once these connections are made, the junction box 206 provides communication and information from and to all of the devices or controls located within instrument panel assembly 30. While not shown, connectors 230 and 232 can be secured to a lower portion of wall 40 of platform 38. By providing complementary connectors to the remainder of the vehicle electrical system on the floor of the vehicle and near the location of connectors 230 and 232, when assembly 30 is installed, the connections can be conveniently made. Further, the connectors 230 and 232 and the complementary connectors on the vehicle floor can be coordinated in their locations and be provided with self-aligning features so that as assembly 30 is installed in the vehicle the connections are automatically made.

Figure 12:
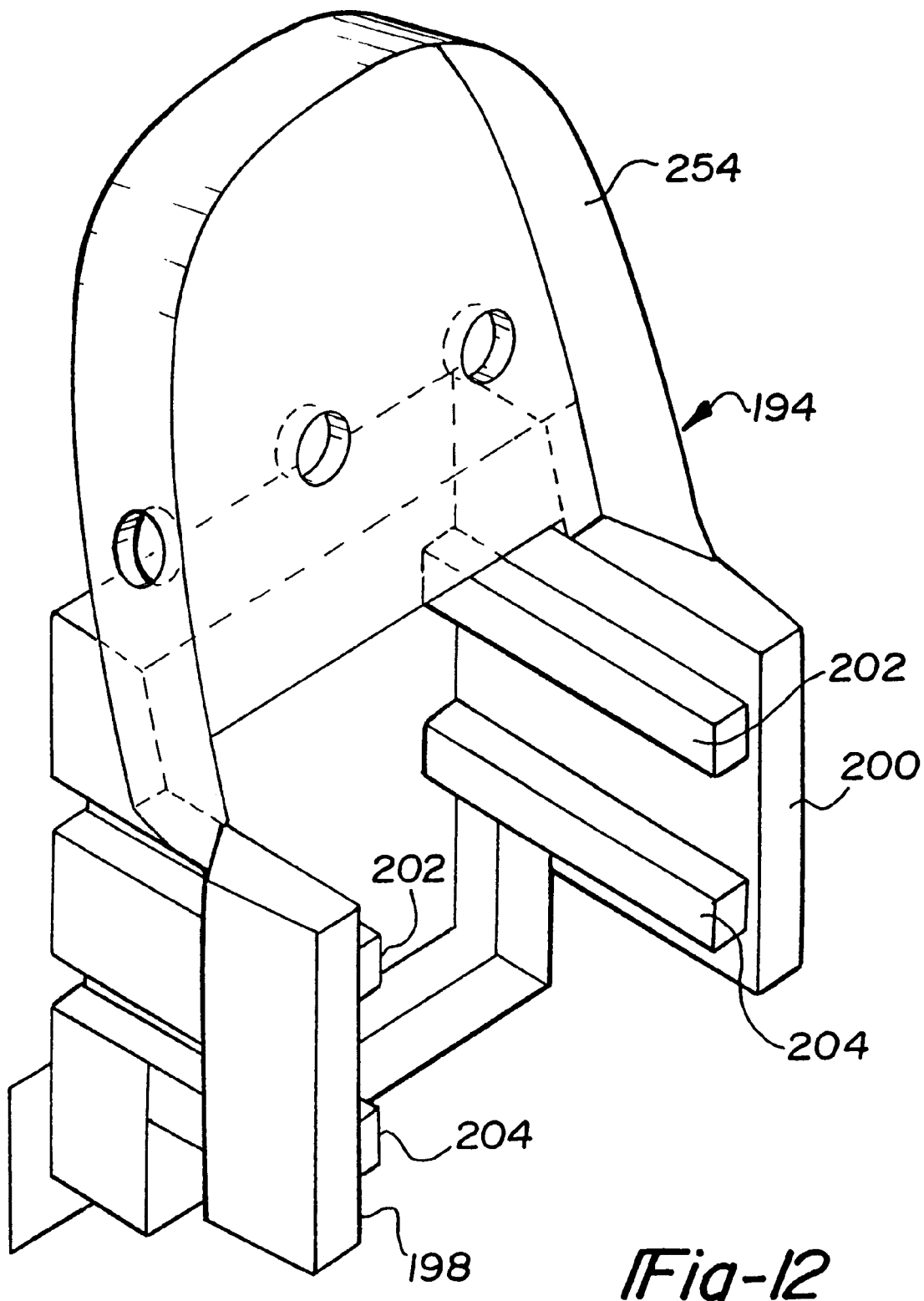
FIG. 12 is an enlarged perspective fragmentary view of the center area of the air distribution module which receives the electrical distribution module shown in FIG. 11.

With particular reference to FIG. 12, vertically spaced mounting rails 202 and 204 can be utilized as support and guide members for the components which are inserted therein. By providing electrical connections which are complimentary to the loading direction of the components, the components can be automatically connected to the junction box 206 and subsequently to the remainder of the vehicle electrical system by way of connectors 230 and 232. This convenience would allow manufactures and owners of the vehicles to quickly change the components, either to replace a malfunctioning component or to upgrade the type of component installed. The junction box of the embodiment just described could include a plug and play feature allowing the junction box to recognize the component inserted in each of the spaces provided so that the junction box would properly control the information flow to and from the particular component. This flexibility would also allow the vehicle owner to customize, to some extent, the location of the components within the center stack area of the instrument panel assembly 30.

Figure 14:
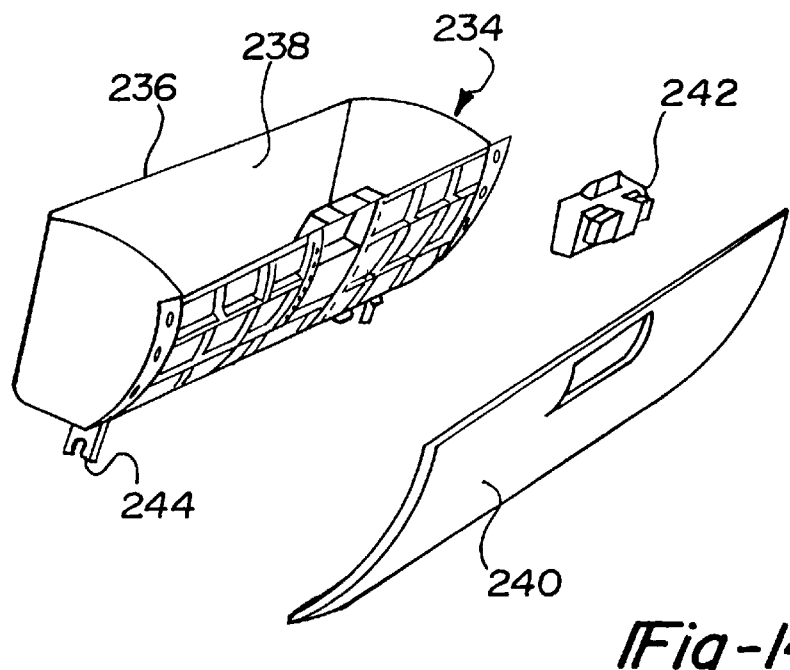
FIG. 14 is an exploded perspective view of the glove box assembly.

Referring to FIG. 14, the instrument panel assembly 30 is shown to also include a glove box assembly 234. The glove box assembly 234 of the preferred embodiment includes a glove box 236 having a concave interior storage area 238 and a finished door 240 with a latch 242. The glove box assembly 234 includes a pair of mounting bosses 244 for pivotally attaching the glove box assembly 234 to the glove box receiving area 246 (FIG. 4) of the rear duct assembly 46 generally located between air outlets 132 and 134.

Figure 13:
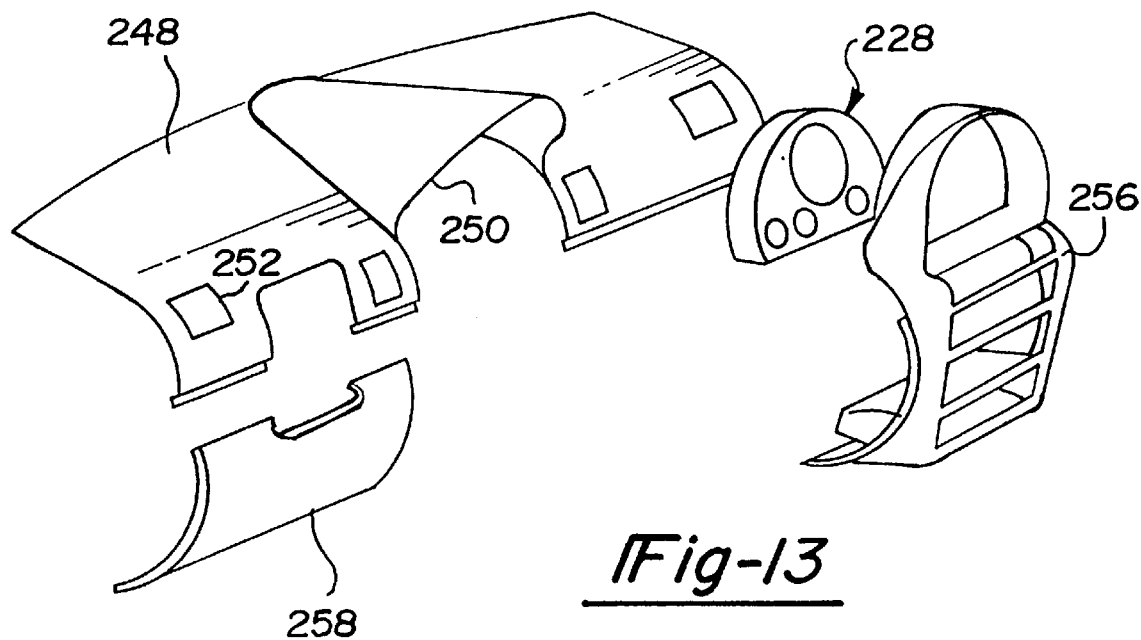
FIG. 13 is an exploded perspective view of the finish trim members for a modular instrument panel assembly of the present invention.

As shown in FIG. 13, the surface of the instrument panel assembly 30 facing the occupant compartment of the vehicle is aesthetically finished by a top pad assembly 248. The top pad assembly 248 can be a foam/vinyl soft-feel shell which covers the plenum top 34 on the interior side of the vehicle as well as the front duct assembly 44 and portions of the rear duct assembly 46. The top pad assembly 248 is configured to provide a smooth generally curvilinear finished surface for the instrument panel assembly 30 at the upper portions thereof. The top pad assembly 248 also includes suitable cutouts 250 and 252 at spaced locations for the air outlets 128–134, as well as for the instrument cluster 228 which provides conventional instrument gauges and warning lights which are coupled by wire harness 224 to the junction box 206 for information from other components controlled by junction box 206 or from components connected to the remainder of the vehicle electrical system and connected to junction box 206 by harness 220 and connectors 230 and 232. Instrument cluster 228 is mounted to the upper end 254 of housing 194 (FIG. 12) in any conventional manner, or by the support and guide system described above. A bezel 256 attached to the front of housing 194 provides a decorative trim for the instrument cluster 228 as well as the below mounted HVAC controls and radio, all mounted within housing 194. A knee bolster 258 attached to rear duct assembly 46 finishes the lower section of the instrument panel assembly 30 below steering column assembly 52 on the left side while similar panels can be coupled to the instrument panel below the glove box assembly 234 if required.

Figure 16:
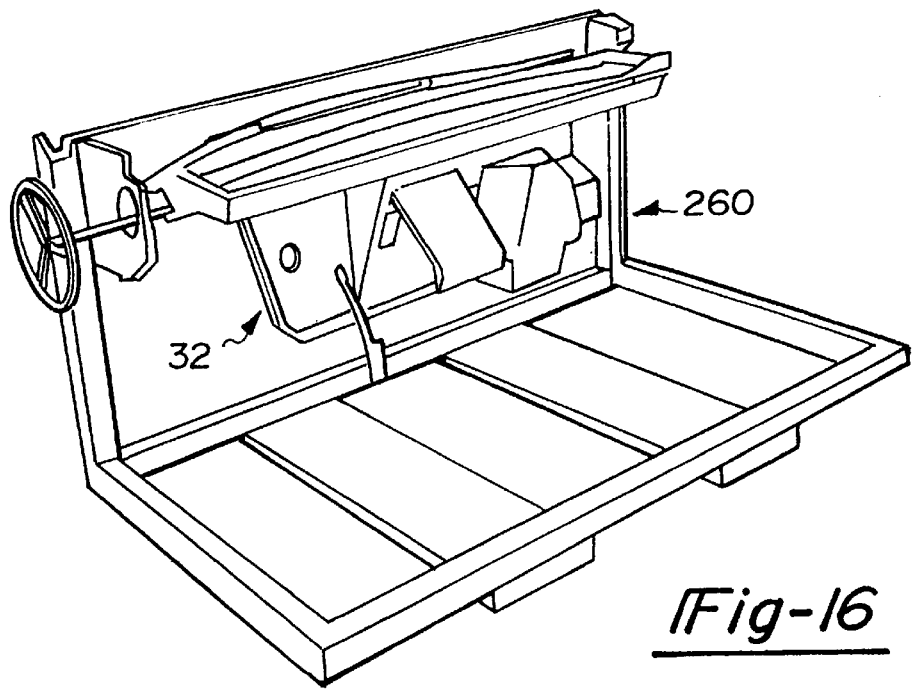
FIG. 16 is a perspective view of an assembly fixture used in constructing an instrument panel assembly of the present invention.
Figure 17:
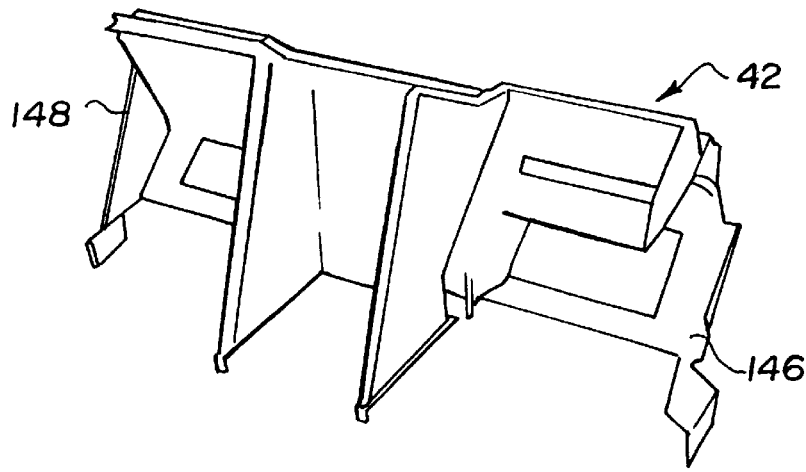
FIG. 17 is a rear perspective view of the air distribution module shown in FIG. 5.

During off line construction, the instrument panel assembly 30 is assembled by first assembling the base module 32 including the plenum top 34, the plenum bottom 36, the platform 38, and end brackets 96 and 98, which are all adhesively bonded together as previously discussed. The base module 32 is then attached to an assembly fixture 260 (FIG. 16) and the sound deadening panel 110 (FIG. 6) is secured to the passenger compartment side of vertically extending wall 40 of platform 38. The pedal assembly 192, a windshield wiper motor and linkages (not shown), and the blower assembly 56 (FIGS. 6 and 10) together with the heat exchanger 90 (FIG. 9) are attached to the base module 32. The heat exchanger 90 is mounted to the support legs 92 and 94 of platform 38 by means of a suitable mounting bracket 262 (FIG. 9).

Next, the steering column assembly 52, and support 50 are secured to one another and are attached to wall 172 and wall 40 as appropriate, with at lease the steering shaft 104 extending through the aperture 100 in the wall 40. The air bag restraint 188 and the cover 190 are installed in steering wheel 180 if not previously installed. The column wire harness 184 is either connected to the wire harness 224 as in the preferred embodiment, or is extended through aperture 100 of wall 40 for connection. The base module 32 is completed by attaching a brake booster pump (not shown) to the rear side of the wall 40, after which the air distribution module 42 is assembled, as seen in FIGS. 4 and 5.

Figure 18:
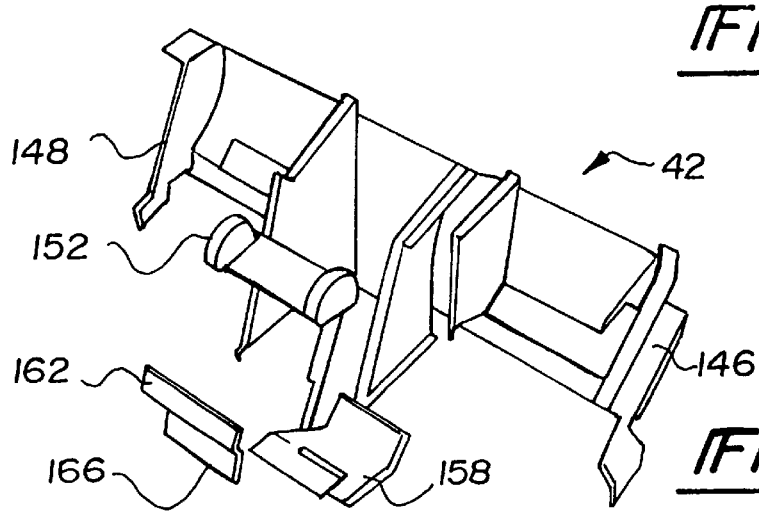
FIG. 18 is an exploded perspective view of the air distribution module and HVAC control elements, shown also in FIG. 6.
Figure 19:
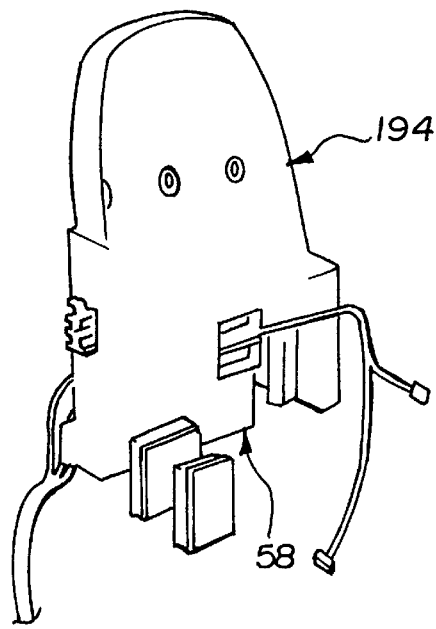
FIG. 19 is a perspective view of the electronic distribution assembly and the housing of the air distribution module shown in FIGS. 11 and 12.

The air distribution module 42 is assembled by joining the front duct assembly 44 and the rear duct assembly 46 together with the end brackets 146 and 148, and ultrasonically welding the adjacent peripheral edges thereof as previously described. Next, the defrost door 152 is attached to the air distribution module 42, the floor mode door 166 is attached, the temperature control door 162 is attached, as is the baffle 158 and controls for the movable doors, as illustrated in FIG. 18. These elements and assemblies are attached using conventional push-nut fasteners and finally, the closeout duct assembly 48 is attached utilizing removable fasteners to improve serviceability. The air distribution module 42, thus, includes the major air controlling components in the center area 106 (FIG. 2) of instrument panel assembly 30 thereby allowing left-hand or right-hand drive steering systems to be utilized as discussed in detail above. The air distribution module 42 is attached to the base module 32 either by appropriate threaded fasteners around the mating peripheral flanges or preferably by a bonding adhesive or welding to bond the polymeric materials together as a single unit.

Figure 20:
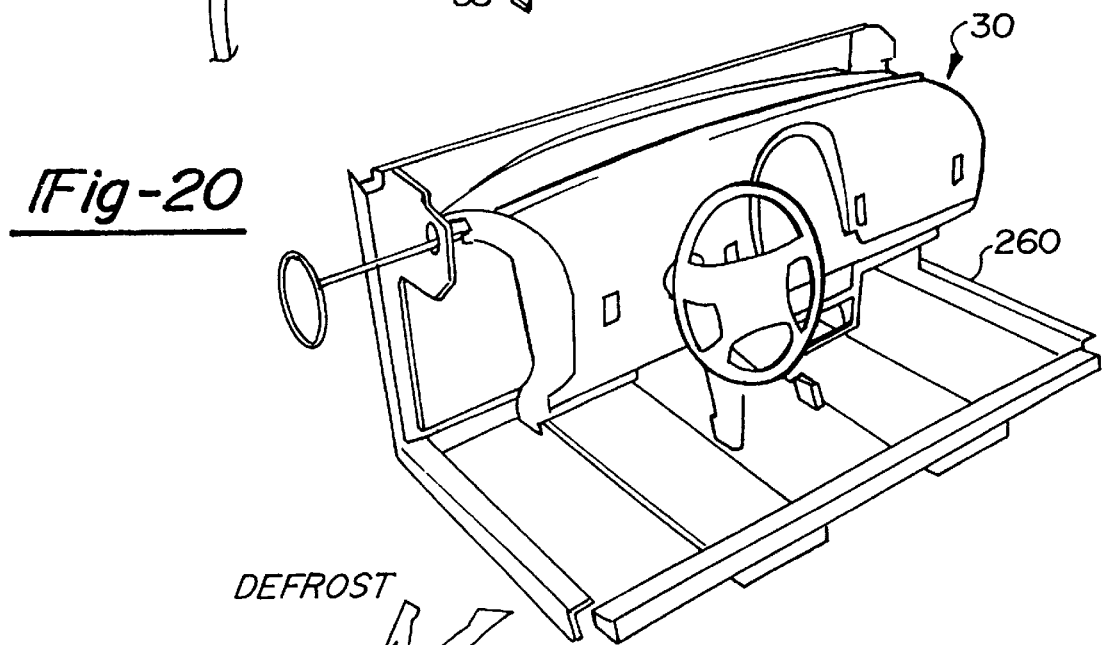
FIG. 20 is a perspective view of an assembled integrated modular instrument panel assembly of the present invention mounted to an assembly fixture.

Next, the remaining components, including the instrument cluster 228, the electrical distribution assembly 58, and the glove box assembly 234, are attached to the instrument panel assembly 30 which is finished with the top pad assembly 248, knee bolster 258, and bezel 256 as shown in FIGS. 13 and 20. The completed assembly 30 is then locked in the assembly fixture for shipment to final assembly location where a robotic insertion arm 60 (FIG. 15) is used for joining the instrument panel assembly 30 to the vehicle structure. The assembly 30 is joined to the vehicle structure by using adhesives, mechanical fasteners, and the electrical connection from the remainder of the vehicle electrical system including the wire harnesses and plugs extending from the ends thereof. The adhesives utilized in joining the assembly 30 to the vehicle structure are preferably structural adhesives which will allow the assembly 30 to become an integral structural member of the vehicle. This structural integration can be enhanced by providing an inward extending flange about the vehicle structure which coordinates with and engages the peripheral edges of assembly 30. The adhesive used should also provide a seal which prevents water, vapors, and other particles and sound waves from passing from the exterior (particularly the engine compartment) of the vehicle to the interior occupant compartment of a vehicle utilizing the present invention.

The instrument panel assembly 30 of the present invention provides a relatively lightweight integrated structure with uniform application to a left-hand or a right-hand drive vehicle and can be assembled at an off site facilitate from the final assembly location thereby providing improved quality control and reduced cost. The present invention also reduces the amount of space required along the final assembly line as well as reduces the labor time required at the final assembly location. Serviceability is also improved by utilizing the present invention when compared to that of a conventionally constructed instrument panel since modular components can be quickly removed and reinstalled thereby providing improved access and ease of interchangeability.

The foregoing discussion discloses and describes a preferred embodiment of the present invention. One skilled in the art will readily recognize from such discussion, and from the accompanying drawings and claims, that various changes, modifications, and variations can be made therein without departure from the true spirit and fair scope of the invention as defined in the following claims.

What is claimed is:

1. An integrated modular instrument panel assembly for a vehicle body of the type having a forward compartment located toward the front of the vehicle and an occupant compartment located rearward of the forward compartment, the assembly comprising:

a base module having a transverse, generally vertically extending first wall located between the occupant compartment and the forward compartment of the vehicle and a generally horizontally extending second wall, and one or more transverse, generally horizontal plenums disposed on said second wall above said first wall, said horizontal plenum providing structural support to said base module;

an air distribution module having an air distribution plenum defined therein, said air distribution plenum providing one or more air outlets for selectively distributing air from said air distribution plenum to the occupant compartment of the vehicle, said air distribution plenum further providing structural support to said air distribution module; and wherein said base module and said air distribution module are integrally secured to one another thereby providing structural support for the vehicle body and further provide a separating barrier between the forward compartment and the occupant compartment of the vehicle body when said first wall is secured to the vehicle body.

2. The assembly of claim 1 further comprising a steering column module secured to said base module.

3. The assembly of claim 2 wherein said steering column module is further comprised of:

a steering column assembly providing a steering column having a steering shaft disposed therein, said steering shaft having a steering wheel fixed to a first end of said steering shaft; and a steering column support having said steering column assembly attached thereto, said steering column support being secured to said base module thereby supporting said steering column assembly relative to said base module.

4. The assembly of claim 1 further comprising an electrical distribution assembly.

5. The assembly of claim 4 wherein said electrical distribution assembly is further comprised of:

a junction box having sockets and connectors therein for receiving and electrically connecting one or more electrical components selected from a group of relays, fuses, connectors, and electronic control modules, said junction box selectively providing electrical and electronic communication between one or more of said components; and a wire harness having one or more wires therein, and a connector attached to an end of said wire harness, said connector being coordinated with and engageable with one or more sockets and connectors.

6. The assembly of claim 1 further comprising a blower assembly mounted to said base module and coordinated with an inlet aperture of one of said transverse generally horizontal plenums.

7. The assembly of claim 6 wherein said blower assembly is further comprised of:

a housing having an air inlet, an air outlet, and a chamber located intermediate said inlet and said outlet, said air inlet coordinated with and in communication with said inlet aperture; and a blower motor for drawing air into and forcing air out through said air distribution module, said blower motor being secured to said housing.

8. The assembly of claim 1, said base module further comprising:

a substantially planar elongated generally rectangular plenum top having a first edge;

a generally rectangular plenum bottom having a second edge, said first edge and said second edge being coordinated to provide mating surfaces between said plenum top and said plenum bottom such that a cavity is formed therebetween when said plenum top and said plenum bottom are joined along said mating surfaces;

a platform having said vertically extending first wall and a generally horizontal second wall extending rearward from a top portion of said first wall; and a pair of generally opposed end brackets coordinated to enclose opposite transverse ends of said plenum top, said plenum bottom, and said platform when said plenum top, said plenum bottom, and said platform are secured to one another, wherein said cavity and said end brackets define one of said generally horizontal plenums.

9. The assembly of claim 1, said air distribution module further comprising:

a front duct assembly;

a rear duct assembly;

a closeout duct assembly; and a pair of generally opposed end brackets coordinated to enclose opposite transverse ends of said front duct and said rear duct when said front duct, said rear duct, and said pair of end brackets are fixedly secured to one another and thereby forming a distribution plenum having one or more air outlets, at least one of said air outlets having flanges thereon, said closeout duct being removably secured to said flanges of said one of said air outlets.

10. An integrated modular instrument panel assembly for a vehicle body of the type having a forward compartment and an occupant compartment located rearward of the forward compartment, the vehicle body providing an unobstructed passage between the forward compartment and the occupant compartment, the instrument panel assembly comprising:

a base module including a platform having a transverse generally vertical wall coordinated with and attachable to the vehicle body to separate and provide a barrier between the occupant compartment and the forward compartment, said platform further including a transverse generally horizontal wall located above and integrally formed with said generally vertical wall, said base module further including a plenum top and a plenum bottom separately formed and integrally secured to said horizontal wall of said platform, said plenum top and said plenum bottom forming a cavity therebetween;

an air distribution module including a generally rectangular transverse front duct assembly and a generally rectangular transverse rear duct assembly, said front duct assembly and said rear duct assembly being separately formed and integrally secured to one another, said front duct assembly and said rear duct assembly providing a transverse distribution plenum in communication with said cavity formed between said plenum top and said plenum bottom, said air distribution module being integrally secured to said base module prior to attaching said generally vertical wall to the vehicle body;

wherein said base module and said air distribution module provide structural rigidity to the vehicle body when said vertical wall is attached to the vehicle body.

11. The assembly of claim 10 further comprising a steering column module secured to said base module.

12. The assembly of claim 11 wherein said steering column module is further comprised of:

a steering column assembly providing a steering column having a steering shaft disposed therein, said steering shaft having a steering wheel fixed to a first end of said steering shaft; and a steering column support having said steering column assembly attached thereto, said steering column support being secured to said base module thereby supporting said steering column assembly relative to said base module.

13. The assembly of claim 10 further comprising an electrical distribution assembly.

14. The assembly of claim 13 wherein said electrical distribution assembly is further comprised of:

a junction box having sockets and connectors therein for receiving and electrically connecting one or more electrical components selected from a group of relays, fuses, connectors, and electronic control modules, said junction box selectively providing electrical and electronic communication between one or more of said components; and a wire harness having one or more wires therein, and a connector attached to an end of said wire harness, said connector being coordinated with and engageable with one or more sockets and connectors.

15. The assembly of claim 10 further comprising a blower assembly mounted to said base module and coordinated with an inlet aperture of one of said transverse generally horizontal plenums.

16. The assembly of claim 15 wherein said blower assembly is further comprised of:

a housing having an air inlet, an air outlet, and a chamber located intermediate said inlet and said outlet, said air inlet coordinated with and in communication with said inlet aperture; and a blower motor for drawing air into and forcing air out through said air distribution module, said blower motor being secured to said housing.

17. An integrated modular instrument panel assembly for a vehicle body of the type having a forward compartment and an occupant compartment located rearward of the forward compartment, the vehicle body providing an unobstructed passage between the forward compartment and the occupant compartment, the instrument panel assembly comprising:

a generally planar elongated transverse plenum top made of a polymeric material having a peripheral edge;

an elongated generally rectangular transverse plenum bottom made of a polymeric material having a peripheral edge coordinated with a portion of said peripheral edge of said plenum top;

a platform made of a polymeric material and having a generally vertical transverse first wall and a generally horizontal transverse second wall projecting rearward of said first wall, said platform having a peripheral edge about said second wall coordinated with said peripheral edge of one of said plenum top and said plenum bottom, said second wall further providing a lip extending rearward of said coordinated peripheral edge;

a pair of base module end brackets made of polymeric material and coordinated with opposite transverse ends of said plenum top, said plenum bottom, and said second wall of said platform, wherein said plenum top, said plenum bottom, and said platform are secured together about said coordinated peripheral edges and said pair of base module end brackets are secured to said ends, thereby forming a base module;

a generally rectangular transverse front duct assembly made of polymeric material and having a first portion of a transverse distribution duct formed therein, and having a peripheral edge;

a generally rectangular transverse rear duct assembly made of a polymeric material and having a second portion of a transverse distribution duct therein, and having a peripheral edge coordinated with said peripheral edge of said front duct assembly;

a pair of air distribution module end brackets made of a polymeric material and coordinated with opposite transverse ends of said front duct assembly and said rear duct assembly, wherein said front duct assembly and said rear duct assembly are secured together about said coordinated peripheral edges and said pair of air distribution module end brackets are secured to said ends, thereby forming an air distribution module;

wherein said air distribution module is secured to said base module along said lip extending from said second wall of said platform such that an integrated assembly is formed.

18. The assembly of claim 17 further comprising a steering column module secured to said base module.

19. The assembly of claim 18 wherein said steering column module is further comprised of:

a steering column assembly providing a steering column having a steering shaft disposed therein, said steering shaft having a steering wheel fixed to a first end of said steering shaft; and a steering column support having said steering column assembly attached thereto, said steering column support being secured to said base module thereby supporting said steering column assembly relative to said base module.

20. The assembly of claim 17 further comprising an electrical distribution assembly.

21. The assembly of claim 20 wherein said electrical distribution assembly is further comprised of:

a junction box having sockets and connectors therein for receiving and electrically connecting one or more electrical components selected from a group of relays, fuses, connectors, and electronic control modules, said junction box selectively providing electrical and electronic communication between one or more of said components; and a wire harness having one or more wires therein, and a connector attached to an end of said wire harness, said connector being coordinated with and engageable with one or more sockets and connectors.

22. The assembly of claim 17 further comprising a blower assembly mounted to said base module and coordinated with an inlet aperture of one of said transverse generally horizontal plenums.

23. The assembly of claim 22 wherein said blower assembly is further comprised of:

a housing having an air inlet, an air outlet, and a chamber located intermediate said inlet and said outlet, said air inlet coordinated with and in communication with said inlet aperture; and a blower motor for drawing air into and forcing air out through said air distribution module, said blower motor being secured to said housing.

* * * * *